Jan. 23, 1945.　　　H. F. PHILLIPS　　　2,367,887
BORING AND MILLING MACHINE
Filed May 16, 1942　　　15 Sheets-Sheet 3
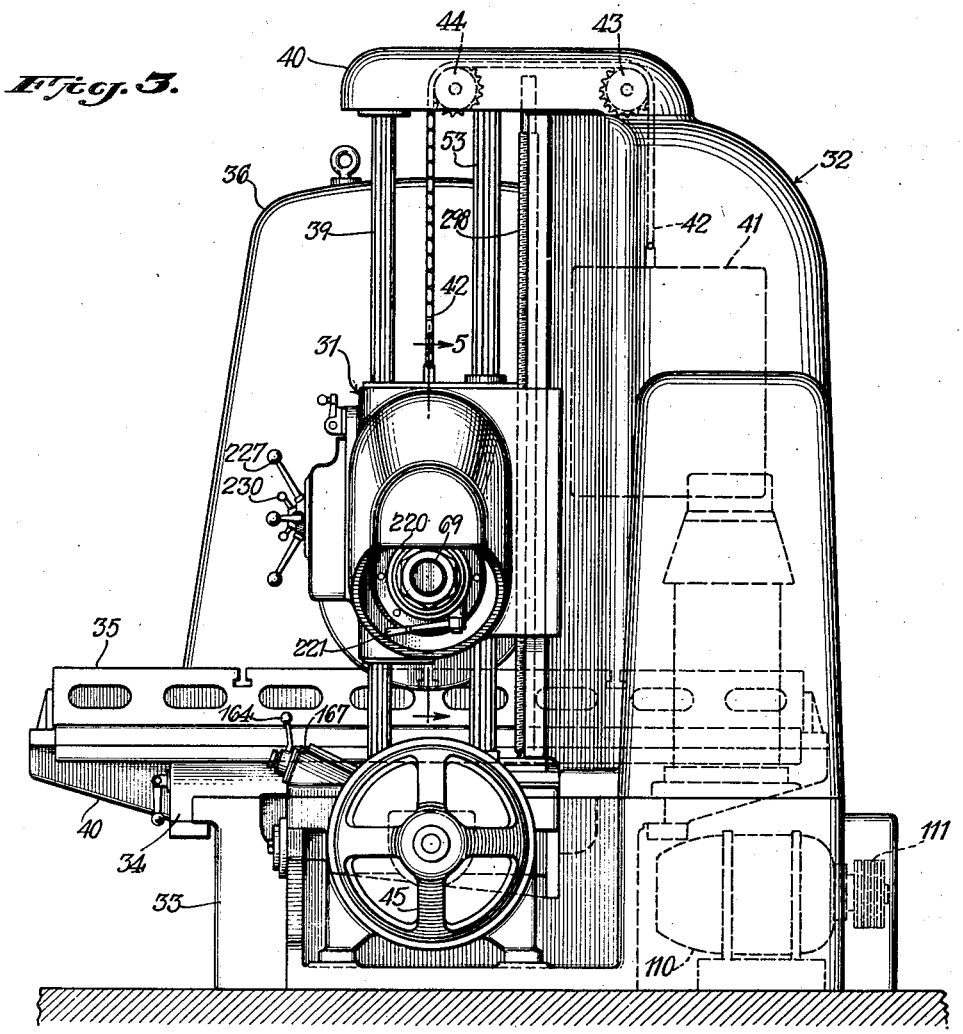
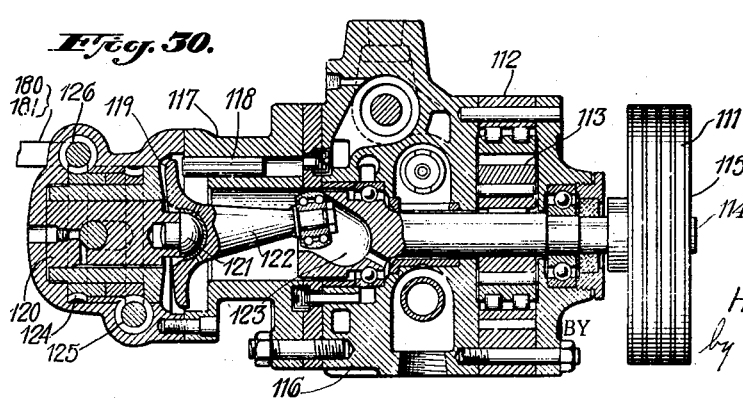
INVENTOR.
HARRY F. PHILLIPS.
BY Benj. T. Rauber
ATTORNEY

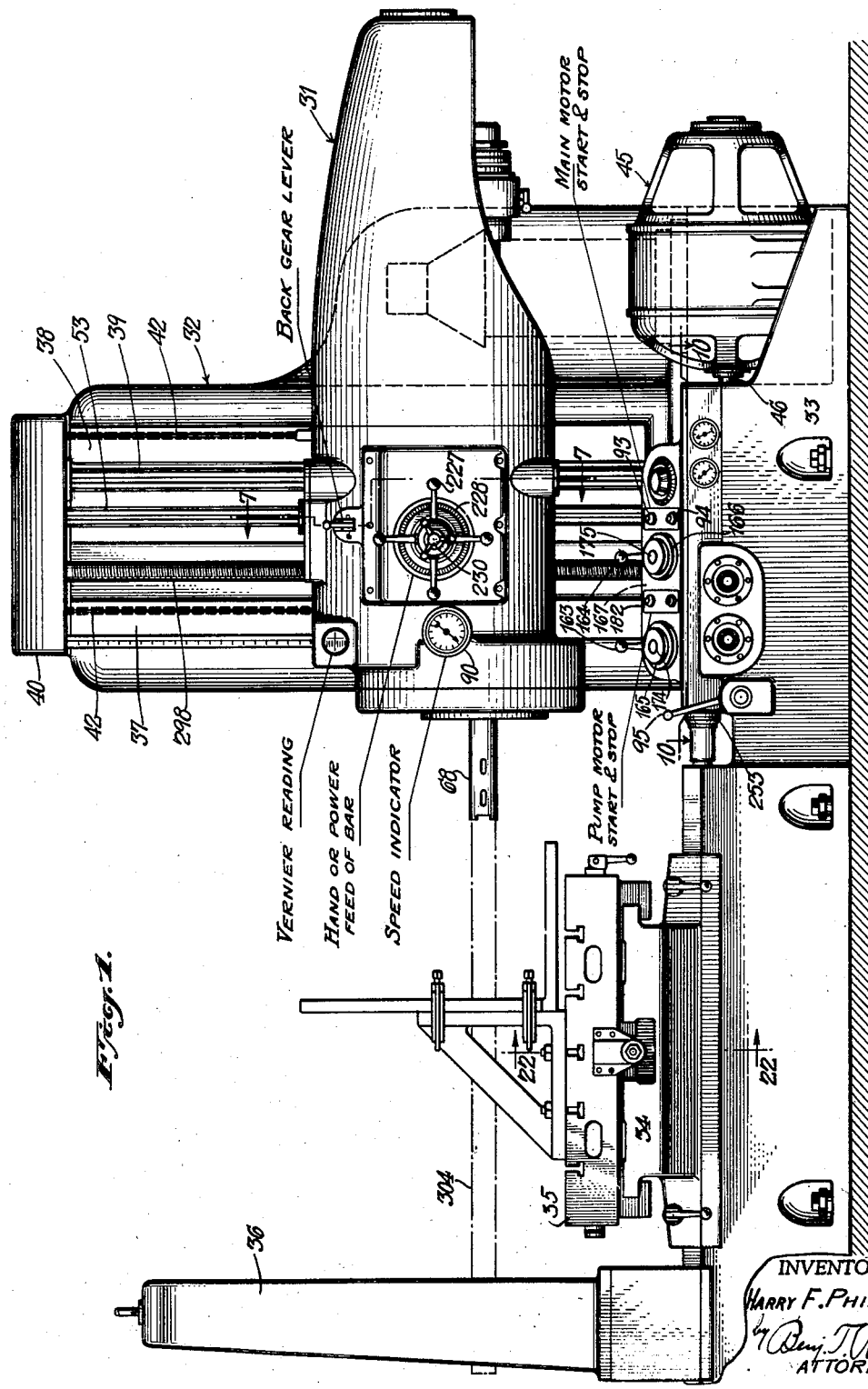

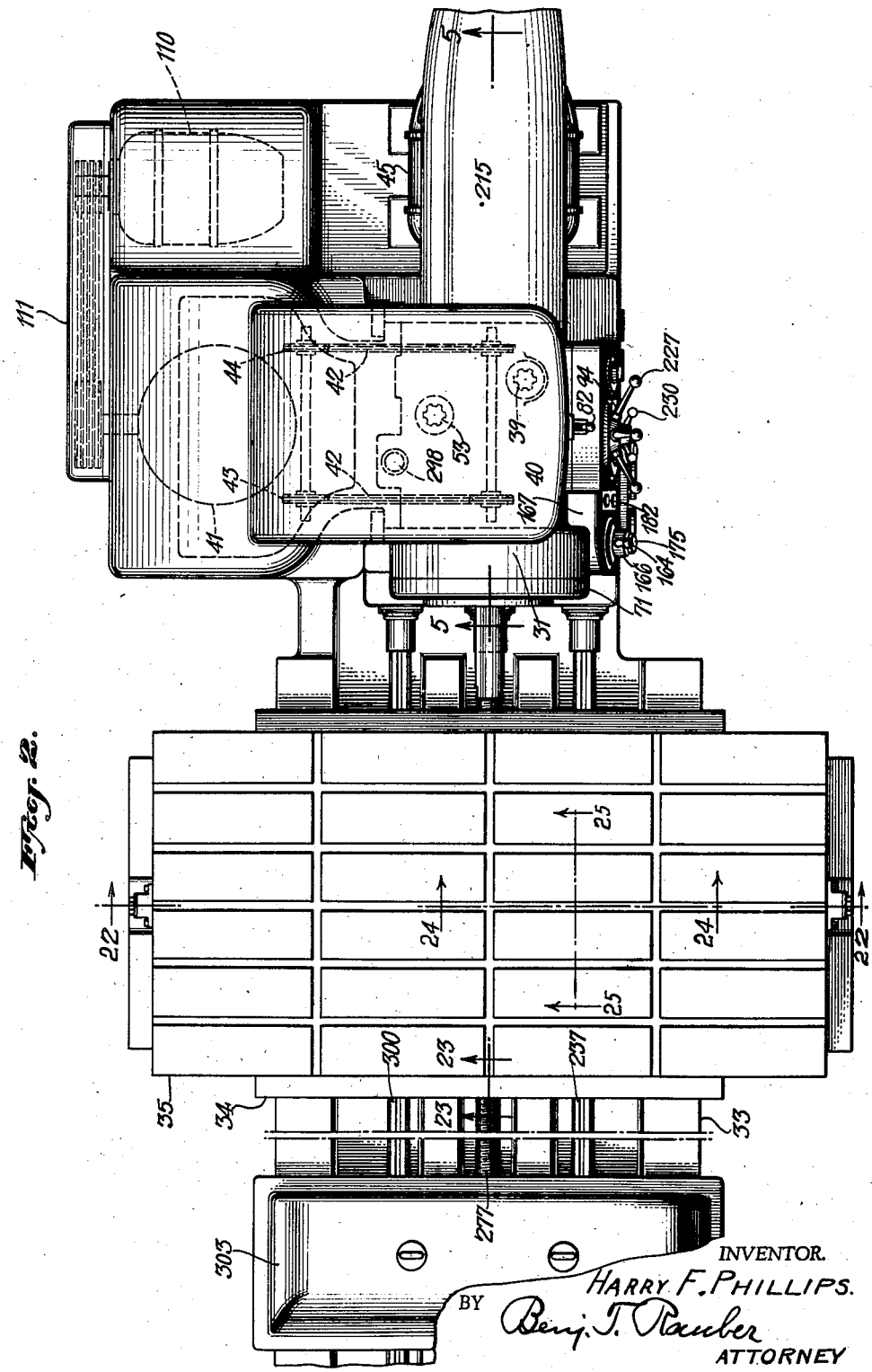

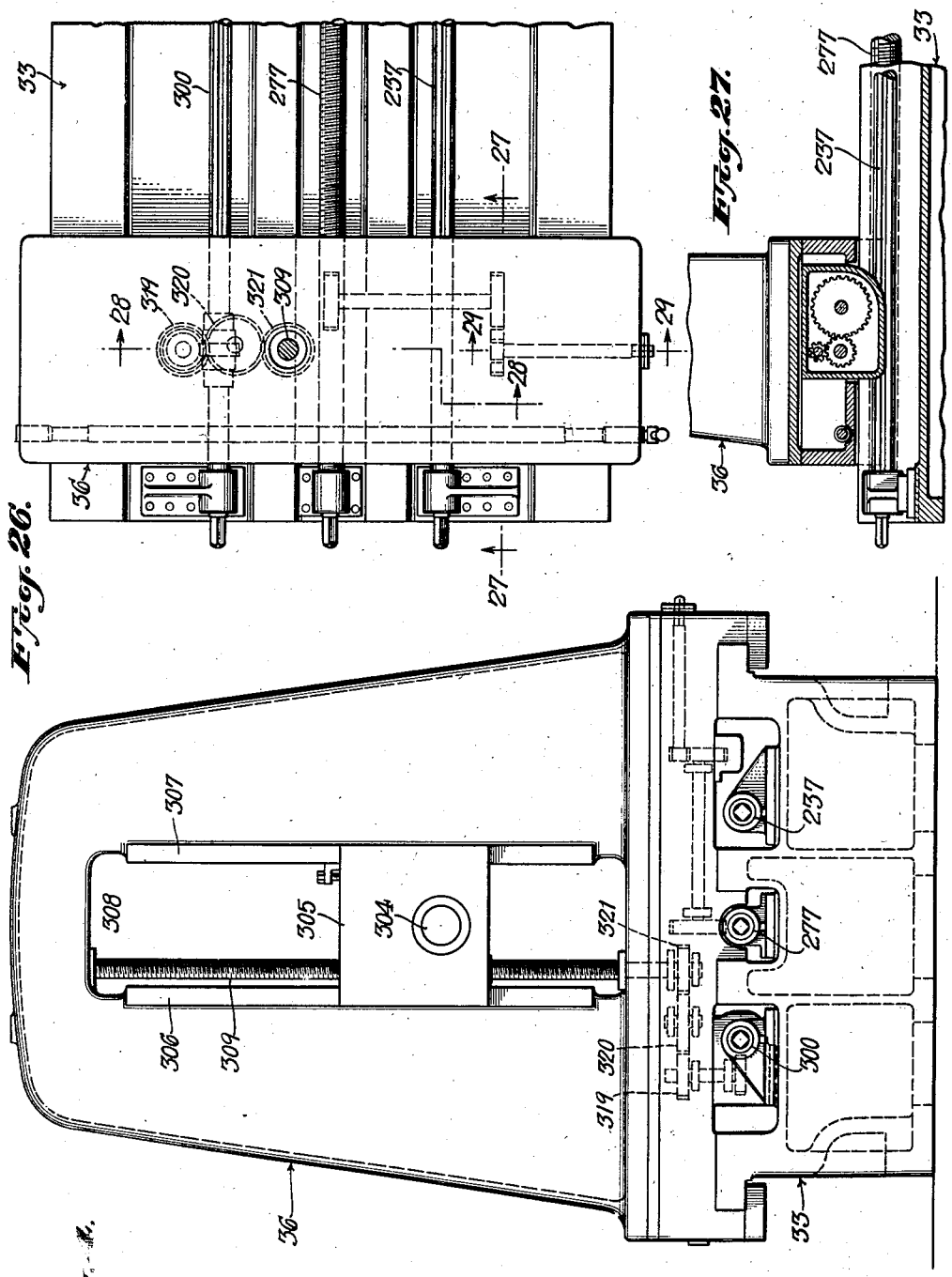

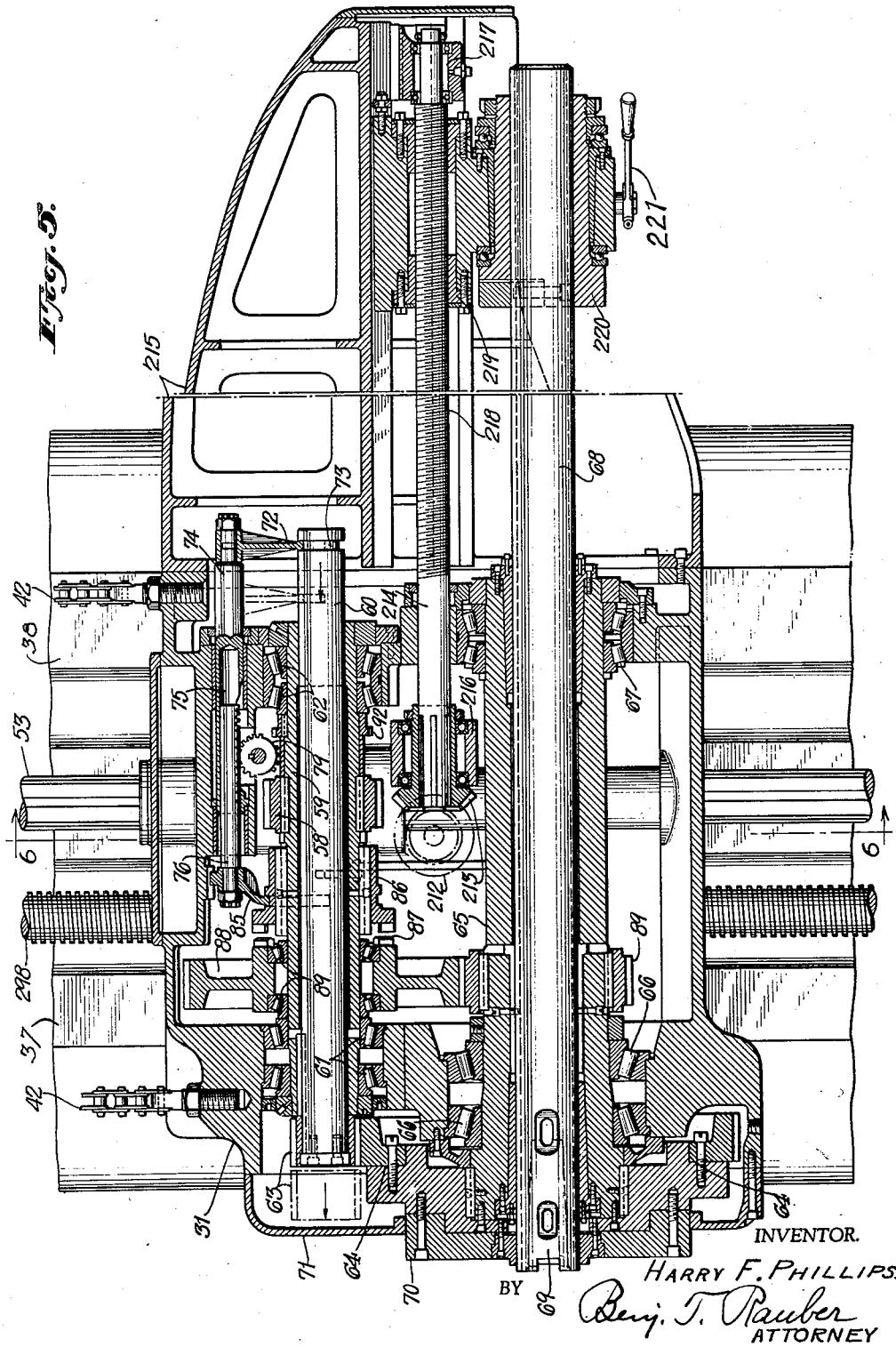

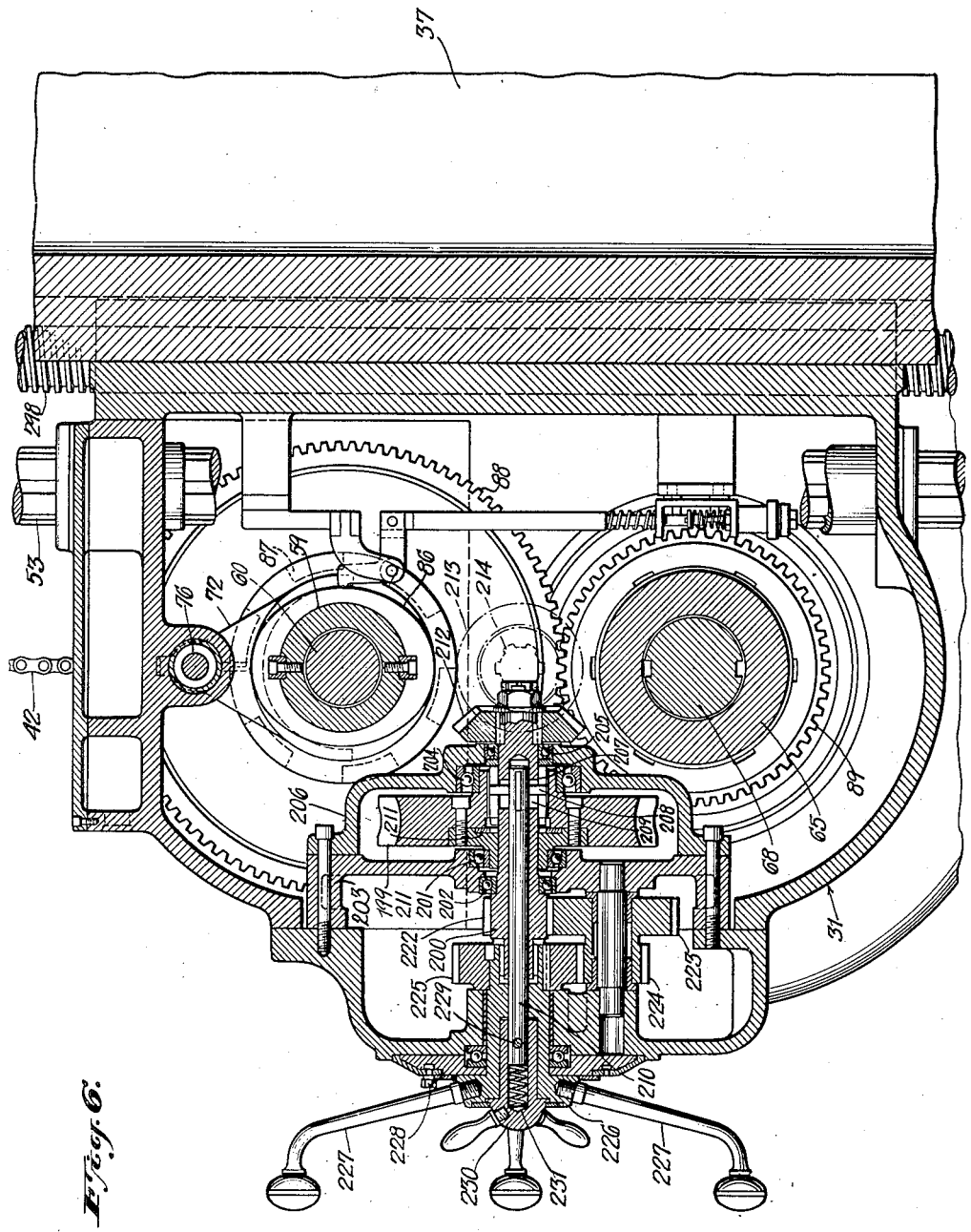

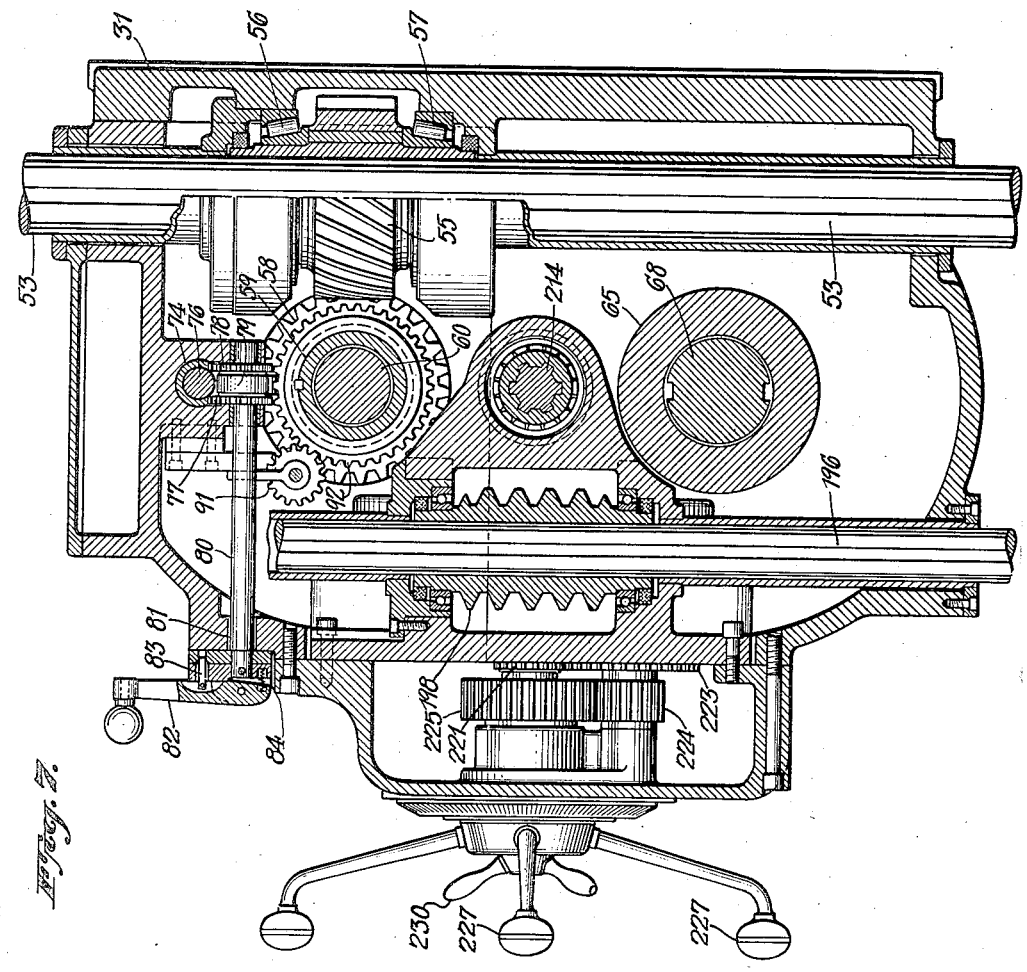
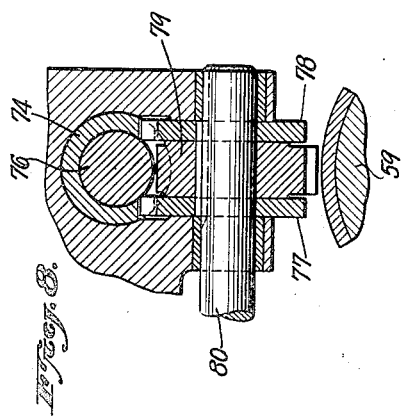
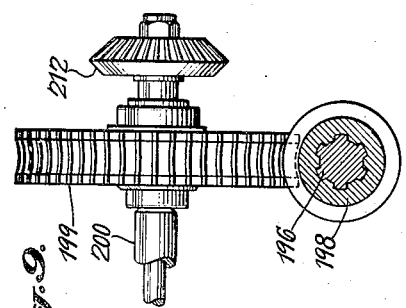

Jan. 23, 1945. H. F. PHILLIPS 2,367,887
BORING AND MILLING MACHINE
Filed May 16, 1942 15 Sheets-Sheet 8

INVENTOR.
HARRY F. PHILLIPS.
BY Benj. T. Rauber
ATTORNEY

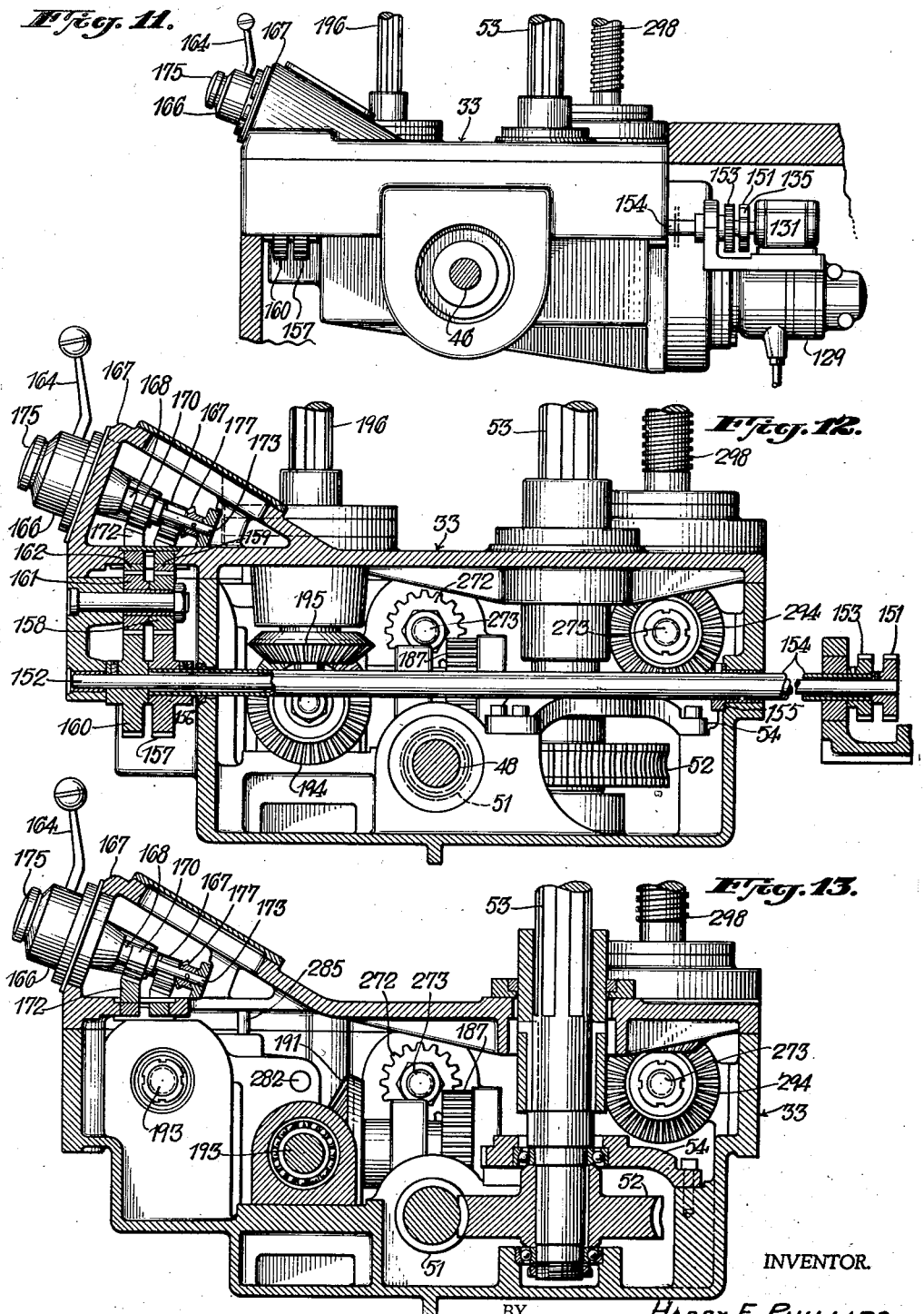

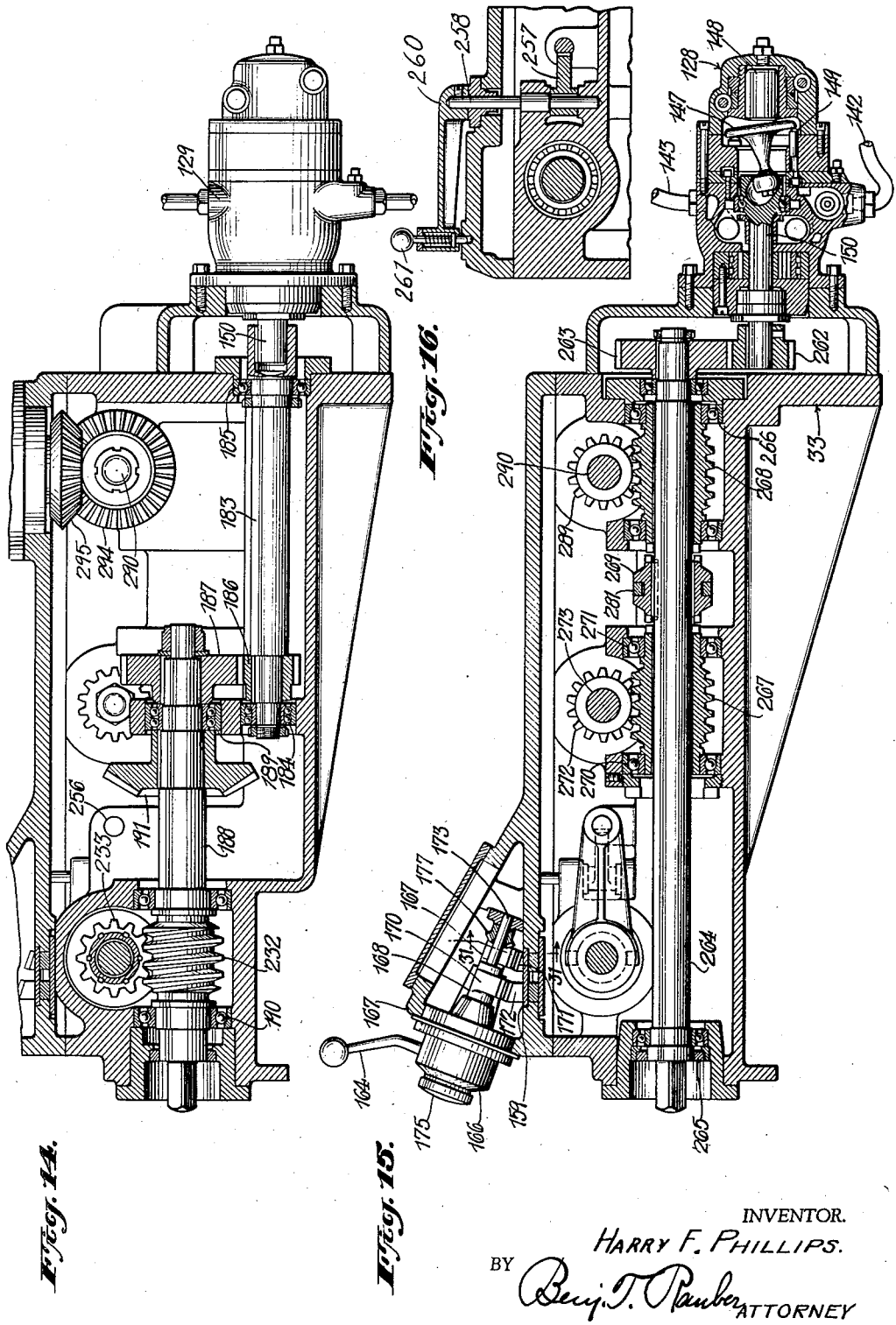

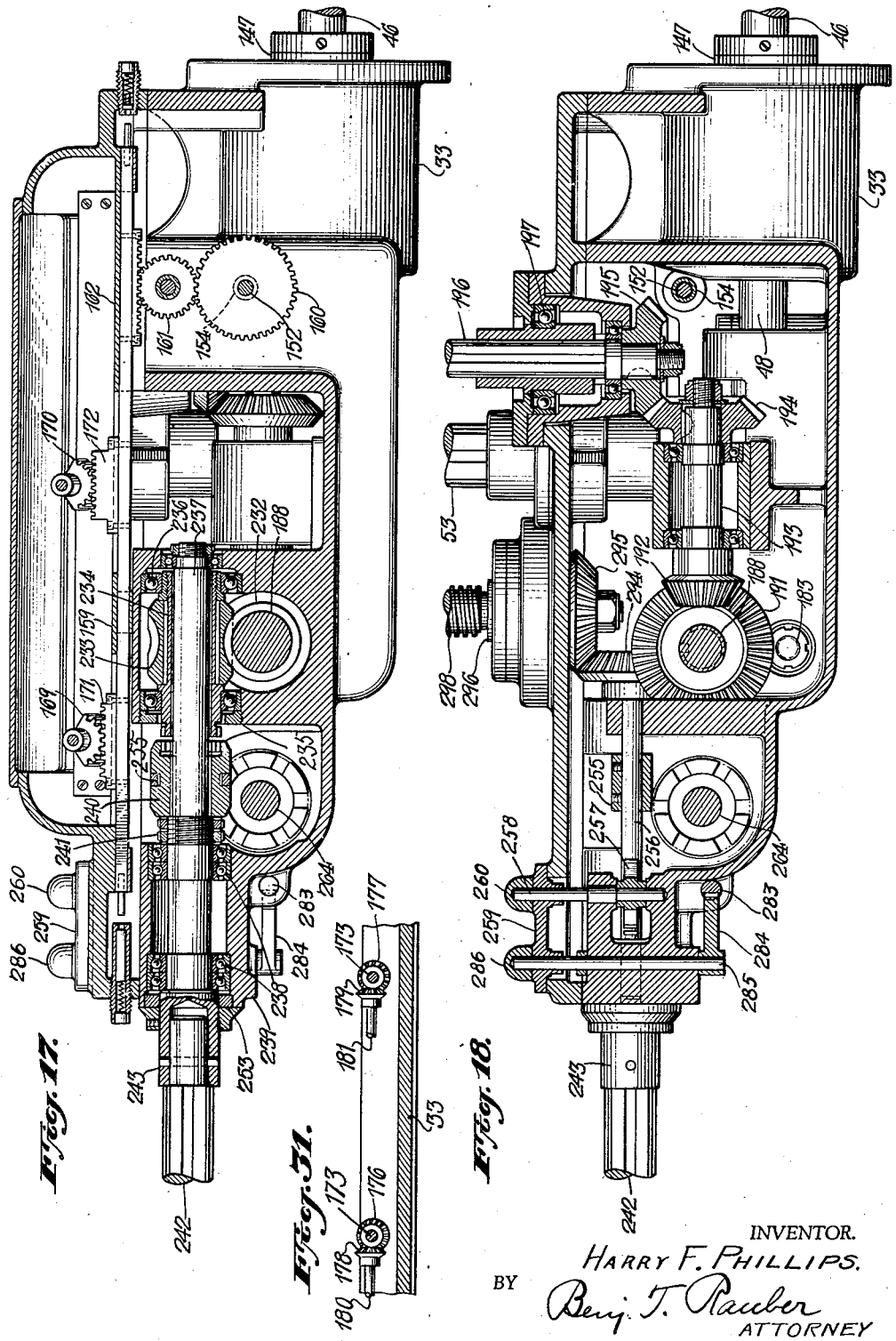

Jan. 23, 1945.  H. F. PHILLIPS  2,367,887
BORING AND MILLING MACHINE
Filed May 16, 1942  15 Sheets-Sheet 12
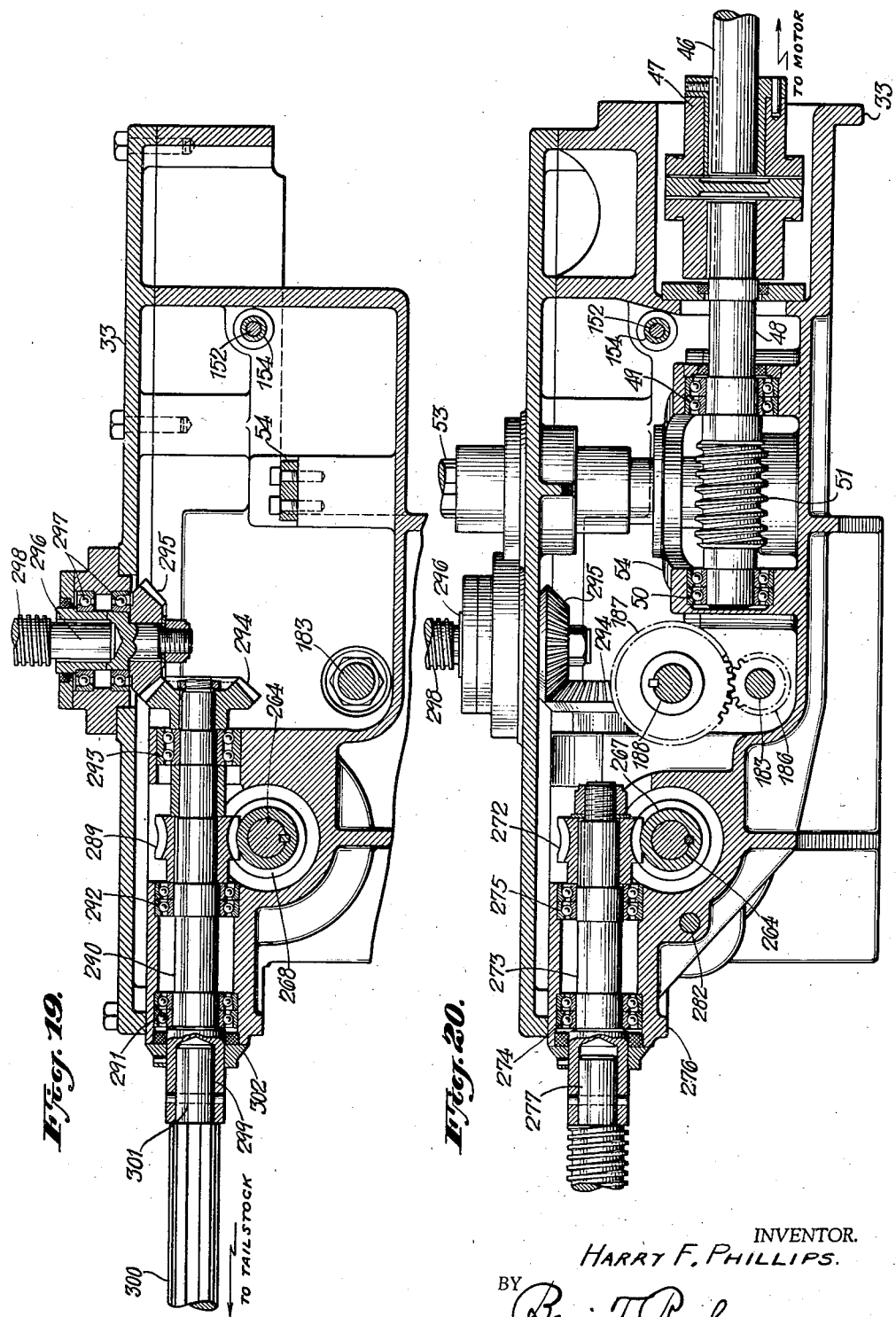
INVENTOR.
HARRY F. PHILLIPS.
BY Benj. T. Rauber ATTORNEY

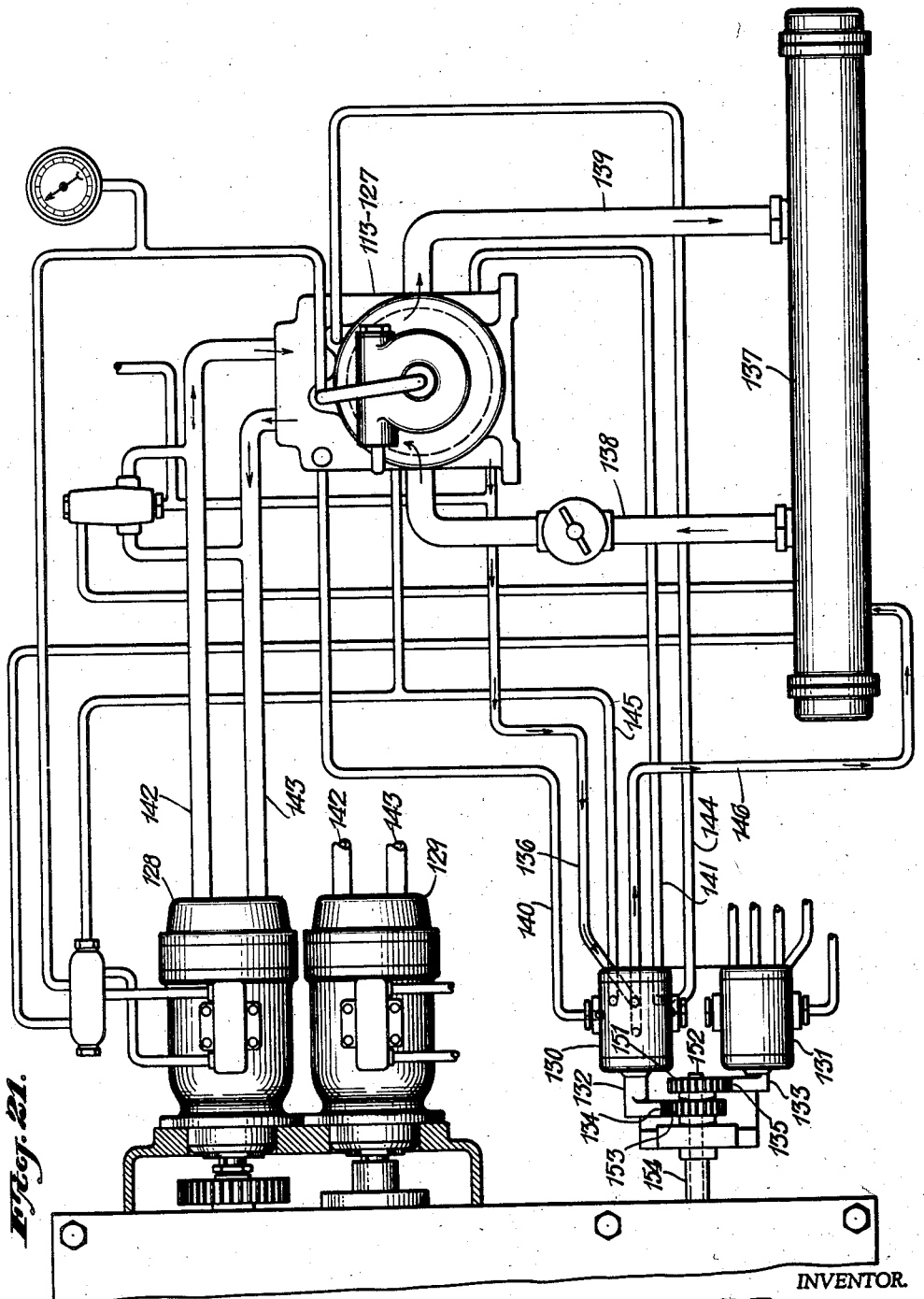

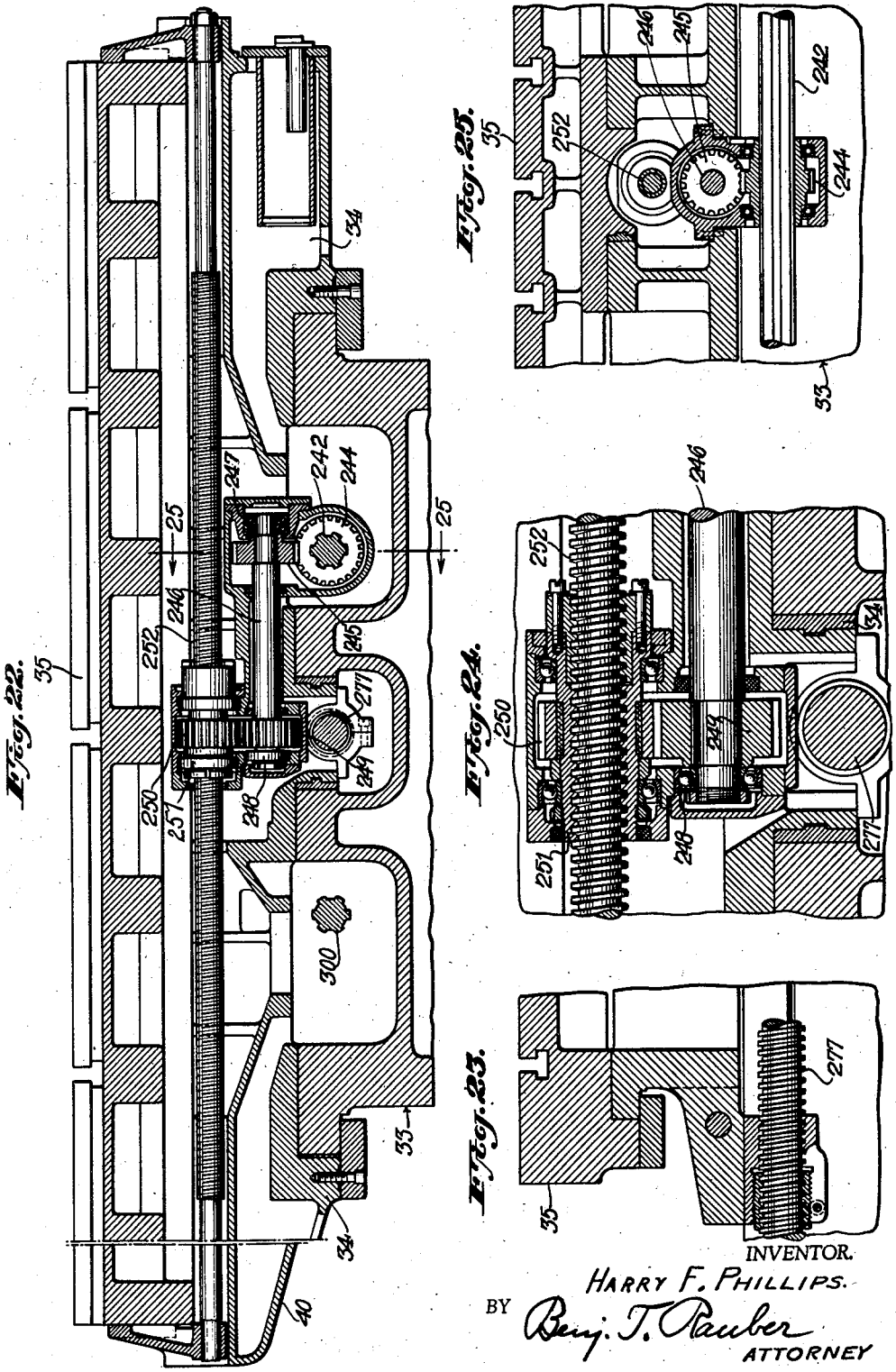

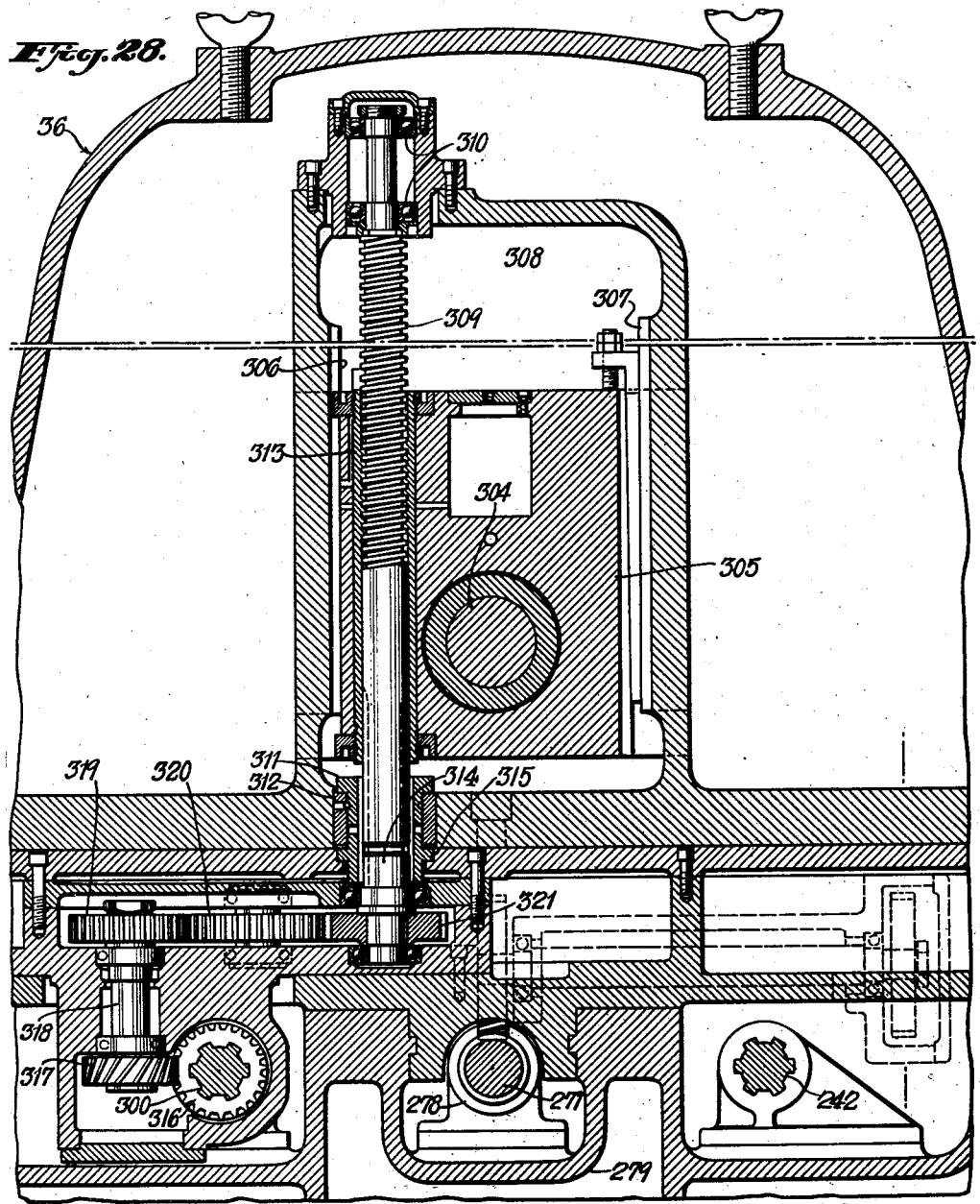
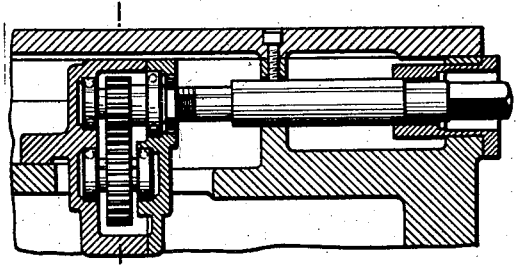

Patented Jan. 23, 1945

2,367,887

UNITED STATES PATENT OFFICE 2,367,887

BORING AND MILLING MACHINE

Harry F. Phillips, Springfield, Mass., assignor to Baush Machine Tool Company, Springfield, Mass., a corporation of Massachusetts Application May 16, 1942, Serial No. 443,204

18 Claims. (Cl. 29—26)

My invention relates to a boring machine and more particularly to a horizontal machine which can be used for drilling, milling, profile milling, boring, slotting and similar purposes.

In the operations of boring, milling, etc., it is necessary to be able to vary the speed of rotation and feed of the tool in order to adapt it to the particular conditions of any given work as, for example, to avoid such a rapid feed as would overheat the cutting tool. This speed will be determined by the hardness or toughness of the metal, sometimes by the precision required as, for example, rough or finish cuts, or by other factors.

Also it is desirable to be able to vary independently the speed of rotation of the cutting tool and the movement of the workpiece relative thereto in horizontal and vertical directions.

In my present invention I provide a machine of the above type in which the speed of rotation of the cutting bar or tool may be varied continuously or by infinite gradations over a very wide range as, for example, eight revolutions per minute to eight hundred revolutions per minute and independently thereof to move the work-supporting table and work horizontally or vertically, also with an infinite gradation, or continuously variable between wide limits as, for example, between one-half and nine inches per minute and with a rapid traverse as, for example, about fifty inches per minute.

To provide a rotation of the tool-carrying bar at a speed of rotation that may be varied progressively throughout the entire range, this bar is driven by an electric drive comprising a motor-generator set which takes in alternating current and supplies a direct current to a direct current driving motor in such manner that the voltage of the direct current supplied by the motor-generator set may be varied to give a range of speed with constant torque and increasing power up to a certain limit and beyond this limit to obtain a further increase of speed at constant power and decreasing torque by control of the direct current field. This is accomplished by providing a separate field current to supply the field of both the generator of the motor-generator set and the field of the direct current motor.

Each of these field circuits is controlled by a rheostat. The field of the generator may be increased thereby increasing the voltage of the generator output. As this voltage is increased the speed of the direct current motor is increased with constant torque and correspondingly increasing power.

When the upper limit of speed range is reached by this method the current through the field of the motor is decreased which results in further increasing the speed of the motor with constant power but reduced torque. This type of control is of the general type known as the "Ward Leonard."

The feed of the boring bar, or movement of the table or support for the workpiece, is controlled by a fluid driven pump. Preferably this fluid system comprises two fluid driven motors, one of which controls the longitudinal movement of the table, that is, longitudinally of the cutting or tool-support bar or, alternatively, the vertical movement of the cross-head, while the second, independently controls the cross feed of the table or, alternatively, the boring bar feed.

The speed of each of these motors may be hydraulically controlled continuously or progressively, or with infinite gradations, so that the relative positions of cutting tool as, for example, a rotating milling cutter and the workpiece, may be continuously varied horizontally and vertically and thus may be guided by the operator through any desired course, whether regular or irregular as, for example, throughout a circular path, elliptical, or of irregularly varying outline.

Similarly, rotation of the cutting bar may be stopped and held fixed while the work-holding table may be moved horizontally in either direction relative thereto, or the cutting bar may be moved longitudinally relative to the table, thereby enabling slotting or keyways to be cut.

For drilling or boring the workpiece the table may be adjusted to any required position relative to the cutting bar and then held while being drilled or bored. Thus a number of different operations may be carried on on a single workpiece without resetting on the table.

The various features of my invention are illustrated, by way of example, in the accompanying drawings in which—

Fig. 1 is a front elevation of a machine embodying a preferred form of my invention;

Fig. 2 is a plan view of the machine shown in Fig. 1;

Fig. 3 is an end elevation taken from the right of Fig. 1;

Fig. 4 is an end elevation taken from the left of Fig. 1;

Fig. 5 is a vertical section through a head stock of the machine taken on line 5—5 of Fig. 3;

Fig. 6 is a transverse section through the head stock taken on the line 6—6 of Fig. 5;

Fig. 7 is a vertical cross-sectional view of the head stock taken on line 7—7 of Fig. 1;

Fig. 8 is a vertical section through a clutch shifting element;

Fig. 9 is a horizontal section, on a reduced scale, through the driving mechanism for the cutting bar;

Fig. 11 is an end view taken from the right of Fig. 10 of the gear box;

Figure 10:
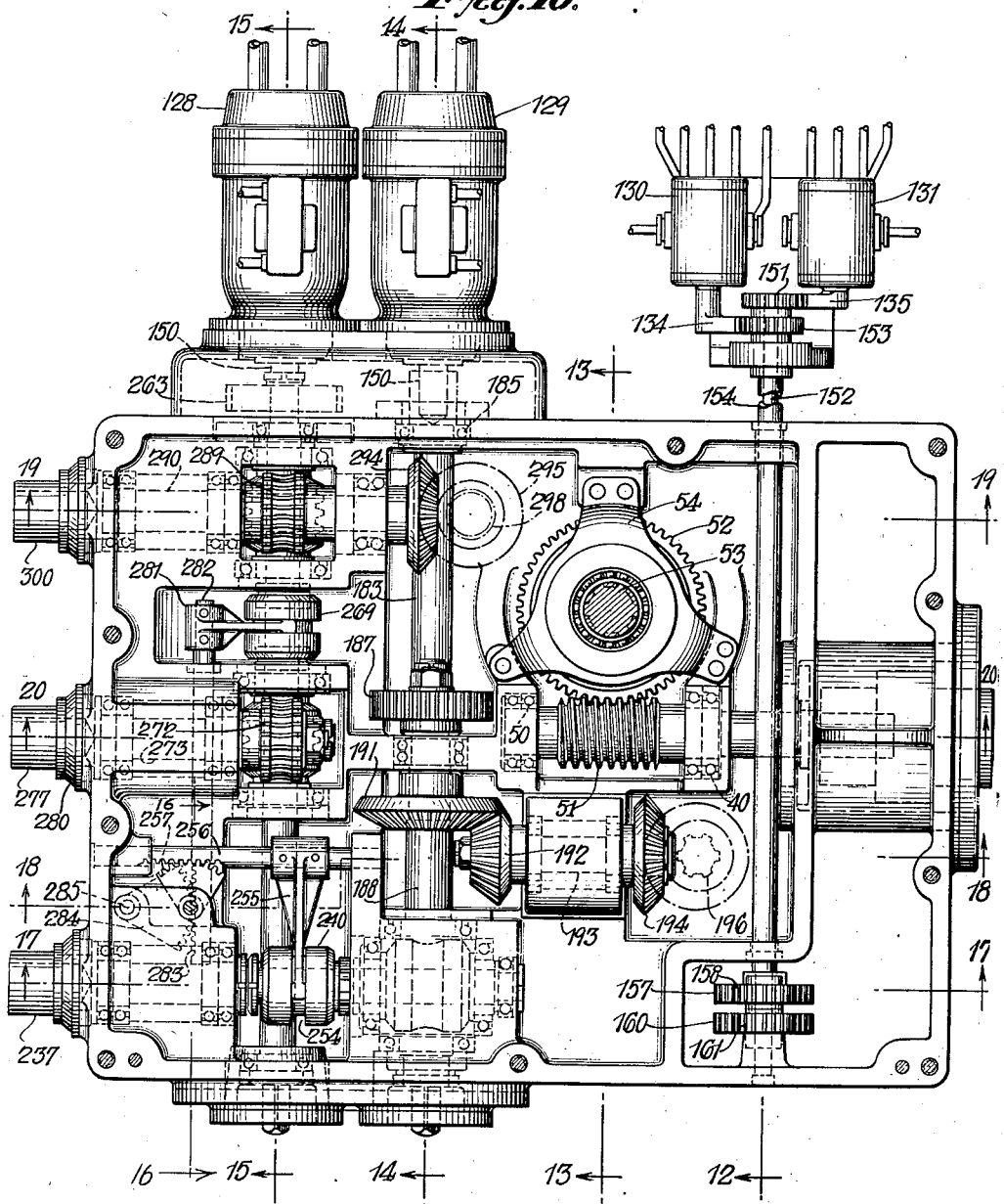
Fig. 10 is a horizontal section through the gear box.

Figs. 12, 13, 14, 15, 16, 17, 18, 19 and 20 are sections taken on the lines 12—12, 13—13, 14—14, 15—15, 16—16, 17—17, 18—18, 19—19 and 20—20 of Fig. 10;

Fig. 21 is a flow or pipe diagram of the hydraulic motor and pump mechanism;

Fig. 22 is a section through the table and supporting saddle of the machine taken on line 22—22 of Figs. 1 and 2;

Fig. 23 is a section on the line 23—23 of Fig. 2;

Figs. 24 and 25 are respectively sections on the line 24—24 and 25—25 of Fig. 2;

Fig. 26 is a plan view of the tail stock and part of the base on which it is mounted;

Fig. 27 is a vertical section on the line 27—27 of Fig. 26;

Fig. 28 is a vertical section of the tail stock and base taken on line 28—28 of Fig. 26;

Fig. 29 is a vertical detail section taken on the line 29—29 of Fig. 26.

Fig. 30 is an axial section through a hydraulic pump and its control valves.

Fig. 31 is a part section taken on the line 31—31 of Fig. 15.

In the embodiment of my invention shown in the accompanying drawings, a head stock 31 is mounted to slide vertically on an upright column 32 extending upwardly from the rear part of a base 33 near one end thereof.

The part of the base 33 immediately below the vertically movable head stock 31 contains a gear box through which power under controlled speeds is transmitted to the head stock and also to an extension of the base 33 on which there is mounted a saddle 34 slidable longitudinally on guides on the extension of the base, and a table 35 slidable on the saddle transversely or crosswise of the direction of movement of the saddle.

A tail stock 36 may be mounted on the base near the end opposite the head stock 31 and column 32. The column 32 is provided with guide plates 37 and 38, Fig. 1, against which are guided sliding surfaces on the head stock 31.

Supported on the upper end of the column 32 and on a vertical shaft 39 spaced forwardly of the column 32, is a bridge 40 from which the head stock 31 is supported. The head stock 31 is counterbalanced by a weight 41 in the column 32 connected to the head stock by means of a chain 42 passing over pulleys 43 and 44 in the bridge 40.

The head stock 31 carries a cutting bar together with gearing for driving or rotating the cutting bar and is in turn driven from the gear box of the base through a splined shaft on which the head stock 31 slides freely vertically.

*Variable cutter bar drive*

The cutting bar is driven by a variable speed motor 45 of the "Ward Leonard" type of alternating current motor generator direct current motor system described above. For this purpose the shaft 46 of the motor, Figs. 1 and 20, extends a short distance into the gear box, or the base 33, and is coupled by a coupling 47 to a drive shaft 48 rotatably mounted in bearings 49 and 50 in the gear box.

Between the bearings 49 and 50 is a worm 51 which meshes with a worm gear 52, Fig. 10, keyed or otherwise secured on the lower end of a vertical splined shaft 53 journalled at its lower end in a spider 54 secured to lugs in the base, and extending upwardly through the vertically slidable head stock 31 to the bridge 40 in which it is journalled at its upper end, Figs. 1, 3, 5 and 7.

Slidably splined on the shaft 53, as shown in detail in Fig. 7, is a worm gear 55 rotatably supported in upper and lower bearings 56 and 57 secured to the rear face of the head stock 31. The splined connection thus enables the worm gear 55 to ride up and down with the head stock 31 and to be rotated by the rotation of the splined shaft 53. The worm gear 55 in turn meshes with a gear 58 which in turn is keyed onto a quill 59 slidably splined on a shaft 60, Fig. 5.

The quill 59 is in turn rotatably mounted between a pair of bearings 61 supported in the left or front end of the head stock, and a pair of bearings 62 mounted in a bracket at the opposite end of the quill. As the motor 45 rotates, it, therefore, transmits its motion proportionately at a reduced speed through the shaft 48 and gears 51, 52, splined shaft 53, worm gear 55, slidably splined thereon, and gear 58 meshing therewith to the quill 59. Within the quill 59 the shaft 60 is slidable and at its front end has a gear 63 which in the rearmost position meshes with a large wheel 64 keyed onto a cutting bar quill 65 rotatably mounted at its front end in bearings 66 in the front wall of the head stock 31, Fig. 5.

The opposite end of the quill 65 is supported in bearings 67 mounted in the opposite end of the head stock 31. Through the above gearing, therefore, the quill 65 is driven from the shaft 60 through the pinion or small gear 63, and the large gear 64 to give the quill 65 a relatively reduced speed in a forward direction. It will be understood, of course, that the speed thus imparted to the quill 65 varies with the variation in the speed of the motor 45.

Slidably keyed within the quill 65 is a boring bar 68 the front end of which has a tapered recess 69 to receive a cutting tool. Also secured to the front end of the hub of the gear 64 is a face plate 70 which may be provided with suitable radial T-grooves, not shown, to which milling or other cutters may be secured to mill or finish the face of a workpiece brought against said face plate.

The space between the edge of the face plate 70 and the driving end of the head stock is enclosed by a cover 71 through which the face plate 70 projects.

The gears 63 and 64 may be moved out of engagement or mesh by sliding the shaft 60 forwardly until the gears are out of mesh and then may be engaged through a second set of gears to drive the cutting bar quill 65 at a higher rate of speed for a given speed of the motor 45. To disengage the gears 63 and 64 the shaft 60 is slid forwardly in the quill 59 by means of a fork 72 rotatably engaging an annular groove 73 on the rear end of the shaft 60 and slidably supported on a sliding shaft 74 to a projecting end of which the fork 72 is bolted. The shaft 74 is slidably supported in brackets in the upper wall of the head stock.

The front end of the shaft 74 has an axial recess 75 into which projects a sliding shaft 76. The lower end or surface of the hollowed shaft 74 is slotted and the lower surfaces of both the shafts 74 and 76 are formed with rack teeth throughout this slotted portion, as shown in Figs. 5 and 8.

The rack teeth of the shafts 74 and 76 are in turn engaged by the teeth of a pair of mutilated gears 77 and 78, or of a central mutilated gear 79 keyed onto a cross-shaft 80 which extends through and is journalled at 81 in the front face of the head stock.

A crank arm or handle 82 is pinned onto the front end of the shaft 80. The crank handle 82 is provided with a pin 83 which is received in a recess in the face of the head stock but which may be withdrawn by tilting the crank 82 on a transverse axis against the reaction of a spring 84. When the pin 83 is thus drawn the shaft 80 may be rotated a full rotation in either direction. When rotated counter-clockwise from the position shown in Fig. 5 the teeth of the mutilated gears 77 and 78 first engage the rack teeth of the hollow shaft 74 and move it to the left, carrying with it the fork 72 and shaft 60 and moving pinion 63 out of engagement or mesh with the large gear 64. Further movement or rotation of the shaft 80 causes the teeth of the intermediate mutilated pinion or gear 79 to engage the rack teeth of the inner shaft 76 and move it to the left.

Mounted on the left end, Fig. 5, of the shaft 76 is a fork 85, the forked ends of which encircle and rotatably engage a clutch member 86. As the shaft 76 is moved to the left, Fig. 5, the clutch member 86 is moved into engagement with a clutch face 87 on a gear 88 rotatably mounted on bearings 89 on the quill 59 and thus imparts the power from the quill 59 to the gear 88, while the shifting of the gear 63 has disconnected this quill from the gear 64.

The gear 88 in turn meshes with a smaller gear 89 keyed onto the cutting bar quill 65 and, therefore, drives the latter. This serves to drive the quill at a much more rapid speed than would be the case through the gears 63 and 64 for a given speed of the motor 45.

To return the drive to a slower speed, it is merely necessary to pull the crank arm 82 outwardly, disconnect the pin 83, turn the crank shaft and arm 80 in the opposite direction, whereupon the teeth of the gear 79 will first engage the rack teeth of the shaft 76 and move the shaft 76 to the right disengaging the clutch 86 and thereafter the teeth of the gears 77 and 78 will engage the rack teeth of the hollow shaft 74 and move it together with the fork 72 and shaft 60 to the right causing the gear or pinion 63 to again move into mesh with the large gear 64.

The speed of the quill 59 may be transmitted to a suitable tachometer 90, Fig. 1, by means of a pinion 91, Fig. 7, meshing with a gear 92, Figs. 5 and 7, and engaging with an attachment through a "Bowden" wire or other suitable connection. The pinion 91 may be supported in a suitable bracket in the casing of the stock head.

The starting switch 93 of the motor 45, and the stopping switch 94, are provided in the upper front part of the base 33 immediately over the gear case. The speed of the motor is controlled from a crank handle 95 which is connected to a drum rheostat rotatable to control successively the field current to the generator of the motor-generator set, which may be conveniently located in the base of the column 32, and the field current to the motor 45.

For example, as the handle 95 is moved progressively in one direction it first increases the field current in the generator thereby giving a lower speed range as, for example, from eight to eighty revolutions per minute; then decreases the current in the field of the motor 45 to give a higher speed with decreasing torque, as from eighty to eight hundred revolutions per minute. In this way a wide range, from eight to eight hundred or any similar range, may be obtained.

Inasmuch as the wiring connections, rheostat, etc., for the motor-generator set and the field of the motor 45 are known and may be of any standard or suitable construction they are not illustrated in the drawings.

*Variable hydraulic drive*

The variable speed drives for the boring bar feed and for the cross and longitudinal feed of the table and vertical feed of the cross head or head stock are obtained by means of a hydraulic pump and a motor driven therefrom together with suitable control valves.

For flexibility of control there are two sets of pumps and hydraulic motors, one of which drives alternatively the longitudinal table feed or the vertical feed of the cross head or head stock, and the other alternatively the cross feed of the table or the boring bar feed. These two have independent circuits and may be independently controlled or driven by a single motor.

The control of the feed is obtained by controlling the delivery of the pump and the direction of rotation of the hydraulic motor is controlled by a reversing valve.

The pump is capable of delivering either a large quantity of fluid at a relatively low pressure for rapid traverse, or a smaller variable amount of fluid under a higher pressure of feed.

The delivery of the high pressure feed is obtained by means of a variable displacement pump supplied with fluid from a constant displacement pump. The variable displacement pump is preferably one having a number of pistons as, for example, five which are displaced by fluid entering through an inlet port and valve under pressure against a "wobble support," that is, a plate supported on a universal fulcrum at its center and having a stem extending at right angles from the center of the plate and the freee end of which may be rotated in a circular path to cause the peripheral part of the plate alternately to push the pump cylinder outward and let it return, thereby giving it a reciprocating action.

The stroke of the pumps may be shortened or lengthened by shifting the wobble plate longitudinally of the pumps. Thus, with a constant speed motor drive for the end of the pump the delivery is controlled by advancing or retracting the support of the wobble plate. However, unless fluid is supplied under pressure the pistons will not be held against the wobble plate and, for this purpose, a high delivery constant displacement pump is employed, which delivers to the variable displacement pump, the excess fluid passing through a pressure release valve back to a central tank or reservoir.

However, by closing this pressure release valve the constant displacement low pressure pump forces the delivery fluid through the inlet and outlet ports of a wobble pump, giving a high delivery for a rapid traverse.

When the pressure release valve is opened above the pressure limit set, the fluid will, however, be delivered at the higher pressure only at a rate determined by the variable displacement pump.

The liquid delivered by the hydraulic pump passes to a hydraulic motor of similar construction to that of the variable displacement pump namely, one having a number of pistons acting against the tilting plate to give a rotary motion to a stem extending therefrom.

The speed at which this motor is driven is in each case governed by the amount of fluid delivered to it and thus the speed of the driving motor may be very closely controlled by gradual and progressive displacement of the support plunger for the pump wobble plate. In this way a variable feed for the table, bar, etc., may be obtained; for example, ranging from one-half inch to nine inches per minute, and minutely or infinitely adjustable between such limits, or providing a rapid traverse of fifty inches per minute.

In the embodiment illustrated in the accompanying drawings, the power for the hydraulic pumps is supplied from a constant speed electric motor 110, Figs. 2 and 3, in the base of the column 32 which through a belt, or other suitable transmission mechanism 111, drives a pair of hydraulic pumps, one for each of the two feed systems.

A suitable variable delivery pump is illustrated in Fig. 30. This pump has a housing made up of a succession of parts, one of which 112, contains a constant displacement rotary pump 113 keyed onto a shaft 114 on which also is keyed a pulley 115 driven by the belt 111.

Immediately adjacent the housing 112 is a port housing 116 containing a number of valves or ports, and a third housing 117 containing a variable displacement pump. The variable displacement pump comprises a number of cylinder bores symmetrically and uniformly disposed about the axis of the pump and containing sliding pistons 118, the outer ends of which may bear against the side surface of a wobble plate 119 supported at its center on a wobble support plunger 120 so as to tilt freely in all directions on a spherical boss 121 thereon. A wobble motion is given to the plate 119 by an integral projecting stem 122 extending from the side opposite the plunger 120 and engaging in an inclined eccentric socket 123 in the adjacent end of the shaft 114 and extending radially therefrom.

The plunger 120 may be moved toward or from the end of the shaft 114 by means of one or more cylindrical cams 124 which engage the surface of the supporting plunger 120, and which may be rotated by screws 125 and 126.

It will be apparent that as the supporting plunger 120 is moved toward the shaft 114, the wobble plate will tend to straighten the end of the stem 122 moving nearer the axis of the shaft 114 and consequently the stroke of the pistons 118 will decrease.

Liquid is drawn through an intake, not shown in Fig. 30, into the constant displacement pump 113 and thence delivered to the inlet ports of the pistons 118. A by-pass comprising a charging valve and a neutral valve, each of which may be closed hydraulically, permits a part of the fluid to escape, the remainder serving to hold the plungers or sliding pistons 118 against the plate 119 entirely closing the pressure release valve. All of the fluid will be delivered by the pump 113 through the inlet and outlet ports of the variable displacement pump for rapid traverse.

Another valve permits return to the supply tank at a pressure insufficient to supply the variable displacement pump and when this valve is opened all the fluid returns directly to the supply tank without passing to the hydraulic motor. This position is a neutral position in which the hydraulic motor is not driven.

In Fig. 21 there are shown two hydraulic motors 128 and 129 for which there are two control valves 130 and 131. Each of the motors and control valves is connected to a separate pump, the connections being indicated for the motor 128, it being understood that the same connections will apply to motor 129 and its control valve 131, but are omitted for the sake of simplicity.

The control valves 130 and 131 have shafts 132 and 133, the ends of which are provided with a segment of a gear 134 and 135 respectively. The shafts 132 and 133 of the valves 130 and 131 may rotate in either direction from a neutral position and each direction of rotation places the valve first into a position corresponding to controlled feed and then upon further movement into rapid traverse either in forward or reverse direction.

Referring to Fig. 21, when the shaft of the valve 130 or 131 is in neutral position, fluid is transmitted from a pressure supply source, not shown, through a pipe 136 to a neutral valve in the pump housing. The pump 113 continuously draws fluid from a supply tank 137 through an intake line 138 and pumps it through the neutral valve directly back to the tank 137 through a return pipe 139.

When the valve shaft is turned toward a reversing position, it supplies fluid through a reversing pipe line 140 to shift the reversing valve and thence through a charging line 141 to cause the fluid delivered by the pump 113 to pass to the variable fluid pump pistons 118 from whence it is delivered through one or the other of a pair of delivery and return lines 142 and 143 to the respective hydraulic motor 128 or 129, the fluid returning through the other of the two lines. This causes the hydraulic motor to be driven at a speed corresponding to the position of the wobble plate 119.

When the valve 130 or 131 is rotated in the opposite direction it releases liquid from the reversing pipe 140 permitting the reversing valve to return to its original or forward position and at the same time supplies liquid through the charging line 144 to reverse the delivery of the pump and cause the fluid to be delivered to and to drive the motor in the opposite direction.

When the valve is turned to its furthermost position it stops the overflow from the pump 113 so that all of the liquid from this pump must then pass through the valves of the wobble pump regardless of the delivery of the latter and supplies a maximum of liquid at a lower pressure to drive the motor 128 either in forward or reverse position.

Fluid for closing the overflow valve from the pump 113 is supplied through a line 145. Excess fluid returns to the supply tank 137 through a pipe 146. Thus by turning the shafts of the valves 130 and 131 to any one of five different positions the pump 113—127 will either fail to deliver any fluid to its respective motor 128 or 129 or deliver a controlled variable supply in either forward or reverse direction, or will deliver a maximum of fluid at a lower pressure in either direction to drive the motors for rapid traverse.

The motors 128 and 129 are similar to the pump 117, having a wobble plate 147, Fig. 15, which is, however, supported on a fixed pivotal support 148 and is operated by a series of pistons or plungers 149 driven by fluid admitted and exhausted through the pipes 142 and 143. The tilting of the wobble plate 147 progressively serves to rotate a drive shaft 150 to drive the respective mechanisms.

The shafts 132 and 133 of the control valves 130 and 131 are rotated or controlled respectively by a pinion 151 mounted on a shaft 152 and a pinion 153 mounted on a quill 154 surrounding the shaft 152, Figs. 11, 12 and 21.

The shaft 152 and quill 154 extend horizontally through the gear casing of the base 33, being rotatably supported in bearings 155 and 156, Fig. 12. Keyed onto the quill is a pinion 157 which meshes through an intermediate or idler pinion 158 with a slidable rack bar 159. Similarly a pinion 160 keyed on the shaft 152 meshes with an idler 161 which in turn meshes with a slidable rack bar 162, Fig. 17. By sliding the bars 159 and 162 respectively, the pinions 153 and 151 are rotated to control the valves 130 and 131.

The rack bars 159 and 162 are independently slidable and are actuated by cranks or levers 163 and 164, Figs. 1, 11, 12 and 15 respectively, carried on rotatable hubs 165 and 166 in an upwardly inclined panel 167 of the base 33. Each of the hubs 165 and 166 carries a respective quill 168 mounted on pinions 169 and 170, Figs. 12, 15 and 17, which in turn mesh with racks 171 and 172 on the rack bars 159 and 162 respectively. Consequently, when the crank handle 164 is rotated it shifts the rack bar 162, rotating the pinions 161 and 160 and the shaft 152, and pinion 151 to actuate the valve 131. Similarly when the handle 165 is rotated it shifts the rack bar 159, rotating the pinions 157 and 158, quill 154 and pinion 153 to actuate the control valve 130.

The levers or cranks 164 and 165 are in mid position for neutral from which they may be turned in either direction to set positions for either forward or reversing variable feed. When swung still further they turn the control valves for rapid traverse in either forward or reverse position corresponding to direction of movement of the lever.

To control the feed, when the levers 164 and 165 are in feeding position, a shaft 173 is provided centrally of the quills of each of the control mechanisms. A knob 174 or 175 is provided on the outer end of the respective shafts to permit them to be turned by hand independently of the hub 166 and on the respective shaft near its inner end there is mounted a bevel pinion 176 or 177 respectively from which control may be transmitted by any suitable means as, for example, by meshing bevel gears 178 and 179 in any suitable flexible transmission, such as a Bowden wire or cable 180 or 181, Fig. 31, which extends to the screws 125 or 126, Fig. 30.

It will be understood, of course, that this flexible connection may be carried to any convenient position other than that shown so that the speed of the various feeds might be controlled from any part of the apparatus.

A stop and start switch 182 for the motor 110 may be provided in the front part of the panel 167. The motor having been started by the switch 182, the operator may then control the direction and speed of the hydraulic motors 128 and 129 independently through the levers 163 and 164 and the knobs 174 and 175.

*Cutter bar feed mechanism*

The cutter bar feed mechanism is driven from the variable speed motor 129 through a gearing in the base 33 to a vertical splined shaft extending upwardly to the head stock or cross bar 31. This gearing comprises a shaft 183, Fig. 14, journalled in bearings 184 and 185 and projecting about and keyed to the drive shaft of the motor 129. The shaft 183 carries a pinion 186 which meshes with a pinion 187 of a shaft 188 journalled on bearings 189 and 190 and which in turn carries a bevel gear 191. The gear 191 in turn meshes with a bevel gear 192, Fig. 10, mounted on a stub shaft 193 carrying a bevel gear 194 keyed thereto, shown in Fig. 18, which meshes with a bevel gear 195 carried on the lower end of a vertical shaft 196 journalled immediately above the bevel gear 195 in bearings 197 and extending upwardly through the head stock 31.

Slidably mounted on the shaft 196 and keyed thereto within the head stock 31 is a worm 198, Fig. 7, which, therefore, moves upwardly with the head stock 31 but is rotatable with the shaft 196. The worm 198 in turn meshes with a worm gear 199, Figs. 6 and 9, rotatably mounted on a quill or hollow shaft 200 with which it may be clutched and from which the bar feed mechanism may be driven. The hub of the gear wheel 199 and the quill 200 are journalled respectively in bearings 201 and 202 in a bracket 203 of the head stock at one side of the gear and in bearings 204 and 205 respectively in a bracket 206 secured to the bracket 203. This permits the gear 199 and the quill 200 to rotate freely when unclutched from each other.

The gear wheel 199 and quill 200 may be caused to rotate together by means of a sliding clutch ring 207 on the quill 200 secured by means of pins 208 extending through slots 209 in the quill 200 into slots in a slidable rod 210, Fig. 6.

When the rod 210 is drawn toward the left the clutch ring 207 is brought into engagement with clutch teeth 211 on the inner part of the hub of the gear 199 and the gear 199 drives the quill 200.

Keyed to the end of the quill 200, projecting through the bracket 206, is a beveled gear 212 which meshes with a beveled gear 213 on a screw shaft 214 extending rearwardly of the head stock 31 into an extension 215 thereof. The screw shaft 214 is rotatably mounted at its forward end in bearings 216, and at its rear end in bearings 217, Fig. 5, to be driven in either direction by the quill 200, gear 199 and gears 212 and 213. The shaft 214 is threaded as at 218 within extension 215. A nut 219 is threaded onto the shaft 218 and is in turn secured to a clamp 220 that engages the cutting bar, or tool holding bar 68. This clamp may be tightened by means of a screw and handle 221.

The clutch ring 207 may be disengaged from the teeth 211 by sliding the rod 210 to the right of Fig. 6, and the quill 200 may then be rotated by hand through a series of gears or pinions 222, 223, 224 and 225 which connect the quill 200 with an axially aligned quill 226, also freely rotatable on the shaft 210, the gears 222—225 being speed reducing gears from the direction of the quill 220 to the quill 226, or vice versa, a speed increasing gearing from quill 226 to 200.

The quill 226 is flanged at its outer end on which are received a number of arms 227 whereby the quill 226 may be manually rotated. A calibrated ring 228 surrounding the outer flange of the quill 226 serves to indicate the position or the degree of movement imparted to the nut 219 by the rotation of the quill 226.

To engage and disengage the clutch 207 the rod or shaft 210 is provided with a pin 229 which engages a helical slot, not shown, in the quill 226 and which passes through a slot in a knob 230 so that by turning the knob 230 the shaft 210 is moved against the action of a spring 231 or, in the opposite direction.

Cross feed of the table

The cross feed of the table on which the workpiece is secured for boring or milling, or other working, is also driven alternatively from the motor 129. For this purpose there is mounted on the shaft 188 a worm 232 which meshes with a wheel 233, Figs. 14 and 17, keyed onto a quill 234 rotatably mounted in bearings 235 and 236 in the base 33 and enclosing a stub shaft 237 which projects beyond the quill 234 and is independently supported on its projecting end in bearings 238 in a projecting housing 239 of the base 33.

The quill 234 is rotatably mounted on the shaft 237 and may be clutched thereto by means of a sliding clutch 240 having teeth that engage corresponding teeth on the end of the quill 234 when pressed thereagainst by a spring 241 confined between the clutch and the bearing 238. The rotation thus imparted to the shaft 237 through the clutch 240 is transmitted to a splined or fluted shaft 242 which projects into a hollow end of the shaft 237 and is pinned thereto as at 243 and which extends lengthwise just beneath the saddle 34 and table 35, as shown in Figs. 1, 22 and 25.

Slidably mounted on the splined shaft 242 but rotating therewith is a spiral gear 244 which engages a spiral gear 245 on a cross shaft 246 at right angles thereto and supported in bearings 247 and 248 mounted on the saddle 34. The shaft 246 in turn carries a pinion 249 which meshes with a pinion 250 which in turn is keyed onto a nut 251 threaded onto a cross screw 252 secured in the table 35.

When the cross shaft 246 is thus rotated by the motor 129 through the intermediate gearing and rotates the nut 251 on the screw 252, secured at its end to the table 35, it thrusts the screw and with it the table in one direction or the other crosswise of the saddle 34 and thus provides a cross feed for the table.

It is understood that the bearings for the nut 251 together with the pinions 249, 250, the shaft 246 and the spiral gears 244 and 245 are all mounted in fixed position on the saddle 34 and may slide lengthwise on the splined shaft 242. A calibrated ring 253, as shown in Figs. 1 and 17, mounted on the shaft 237 may serve to indicate the relative movement or position of the table.

To disengage the table the clutch 240 is moved to the left in Fig. 17, away from engagement with the quill 234 so that the quill 234 may rotate freely on the shaft 237 without driving the latter. For this purpose the clutch 240 is provided with a circumferential groove 254 which in turn engages a forked shifting arm 255, Fig. 10, mounted on a sliding bar 256. The sliding bar 256 is freely slidable in the base 33 and has rack teeth engaged by a gear sector 257, Figs. 10 and 18, secured on a vertical rock shaft 258 extending upwardly through the upper part of the base 33 and through a bearing 259 thereon and having on its projecting end a crank arm 260, Figs. 16 and 18.

The arm 260 has at its free end a knob and pin 261 whereby it may be swung and secured in either clutching or unclutching position. It will be apparent, therefore, that the cross feed and the bar feed may be operated independently of each other with their respective clutches.

Longitudinal table movement

The longitudinal movement of the saddle 34, and with it the table 35, is driven from the motor 128 alternatively to the vertical movement of the cross head. For this purpose power is transmitted from the motor 128 through shaft 150 to a pinion 262 which in turn meshes with a pinion 263 mounted on a shaft 264 which is journalled at its opposite ends in bearings 265 and 266 in the base 33.

Rotatably mounted on the shaft 264 are a pair of worm gears 267 and 268 on opposite sides of a sliding clutch 269 keyed or splined to the shaft 264. The worm gear 267 is mounted in fixed position between a pair of bearings 270 and 271 in the housing 33 and meshes with a worm wheel 272 keyed onto the projecting end of a stub shaft 273 journalled in bearings 274 and 275 in a projecting collar 276 of the base 33.

The projecting end of shaft 273 has a recess in which is received and pinned the end of a screw shaft 277 which extends lengthwise of the extension of the base 33 below and beyond the saddle 34.

Threaded onto the shaft 277 is a nut 278 having a base secured to a depending bracket 279 on the saddle 34, Figs. 22, 24, 28, in such manner that as the screw shaft 277 is rotated in one direction or the other the nut 278 threads lengthwise correspondingly and carries the saddle with it longitudinally on the base 33.

The movement of the shaft 277 may be measured by a calibrated collar 280, Fig. 10.

The clutch 269, Figs. 10, 15 and 18, may be shifted either in one direction into engagement with the worm 267, or in opposite direction by means of a shifting arm 281, Figs. 10, 15 and 18, having a forked end that engages a circumferential groove in the clutch 269 permitting the latter to be rotated while engaged by the shifting arm.

The shifting arm is carried on a sliding rod 282 which has rack teeth 283, Fig. 10, at its forward end meshing with the teeth of a gear segment 284 on a vertical shaft 285, the upper end of which projects above the base 33 and through the bracket 259.

Mounted on the upper end of the shaft 285 is a manually operated handle 286, Fig. 18. Accordingly the drive shaft of the motor 128, the speed and direction of rotation of which are controlled by the handle 165 and knob 174, may be clutched directly to the driving screw 277 to move the saddle and table longitudinally of the vertical movement of the cross head.

Vertical movement of head and tail stocks

When the clutch 269 is shifted by the shifting arm 281 in the opposite direction it couples the drive shaft 264 to the worm 268, which in turn meshes with and drives a worm wheel 289 keyed on the shaft 290 journalled in the bearings 291, 292 and 293, Fig. 19. One projecting end of the shaft 290 has keyed thereon a bevel gear 294 which meshes with a gear 295 of a stub shaft 296 rotating in bearings 297 on the upper surface of the base 33. The stub shaft 296 is recessed to receive, and is keyed or otherwise secured to the lower end of a vertical screw 298, extending upwardly through the cross head or head stock 31 and threaded in the head stock or cross head 31 so that as the screw 298 rotates it raises or lowers the head stock.

When a tail stock is used it is secured to the opposite end of the base 33 and if a cutting bar is to be mounted in the tail stock the support, therefore, must be raised or lowered, as the case may be, synchronously with, and the same distance as, the lifting or lowering of the head stock. For this purpose the opposite end of the shaft 290 is recessed as at 299 to receive the end of a splined shaft 300 which is pinned to the shaft 290 by a pin 301. The end of the shaft 290 may also carry a calibrated ring 302 to indicate the position of the head stock or its relative movement.

The shaft 300 extends to the opposite end of the base 33 where it serves to operate a vertically movable tool bar bearing block in the tail stock 303 which may be bolted on the base 33 at the tail end thereof.

It will be understood that the tail stock is removable and need be used only to support the tool bar when the latter is subjected to reactions or stresses a considerable distance from the head stock. When installed for this purpose the free end of a tool bar or cutter bar 304, the opposite end of which is mounted in the recess 69, Fig. 5, is received and supported in a bearing block 305, Fig. 4.

The bearing block 305 is guided between a pair of guides 306 and 307 on opposite sides of a vertical opening 308 in the tail stock and is moved to and held at a vertical height corresponding to that of the head stock by means of a vertical screw shaft 309 journalled at its upper end in bearings 310 at the outer end of the tail stock and at its lower end is splined to a collar 311 supported in a roller bearing 312 in the lower part or base of the tail stock.

The screw shaft 309 is threaded in a nut 313 in the block 305 so that as the screw turns it raises or lowers the block. The screw shaft terminates within or flush with the lower surface of the tail stock so that when removed it will not project therefrom.

When mounted in place on the bed of the machine, however, it aligns with a vertical stub shaft 314 in the base 33 and is connected thereto by a collar 315 enclosing the ends of the shafts 309 and 314 and being splined in common to them. Any rotation imparted to the shaft 300 is transmitted to the stub shaft 314 and thence to the vertical screw shaft 313 by a gearing comprising a spiral gear 316 splined onto the shaft 300 and meshing with a spiral gear 317 on a vertical stub shaft 318, the upper end of which is keyed to the gear 319 of a gear set, also comprising an intermediate gear 320 and a third gear 321, the latter of which is keyed onto and drives the stub shaft 314.

Through the above gearing rotation imparted in either direction from the motor 128 through the shaft 290 to the screw shaft 298 of the head stock is also transmitted through the longitudinal shaft 300 and the intermediate gearing through the vertical screw shaft 309 of the tail stock and, accordingly, the tail stock bearing block 305. Being once set level with the driving shaft 68 of the head stock it will, therefore, always move simultaneously with the head stock and maintain the same height.

Résumé

In using the machine a workpiece is mounted on the table 35, as indicated in Fig. 1, and the motor 45 started. By moving the rheostat control arm 95 the motor may be speeded up or retarded. At low speeds the speed will increase with constant torque and increasing power as current is supplied to the field winding of the generator that supplies the motor 45. At high speeds, however, the speed will increase by cutting out some of the current to the field windings of the motor 45, thus obtaining an increasing speed with a corresponding decrease in torque. This change in speed may be made at any time and done very simply by swinging the rheostat control arm 95. At the same time the motor 110 will be in operation to drive the hydraulic pumps as shown in Fig. 30. The speed of delivery of these pumps may be controlled to deliver a relatively small variable quantity of liquid governed by the speed of rotation of the drive shaft 114, which is constant, and the decrease of inclination of the wobble plate 119 and accordingly of the stroke of the pistons 118, or a larger amount delivered by the rotary pump 113. The direction of delivery of the liquid may be controlled for forward or reverse driving, and the selection between the variable low speed drive and rapid return, forward or reverse for the respective pumps, are controlled by the lever arm 164 acting through the sliding plates 159, 162 and shafting and gearing to the respective control valves 130, 131.

With the apparatus set for variable feed the rate of feed is controlled from the knobs 174, 175 through the cables 180, 181 and thence to the screws 125, 126, Fig. 30, which control the tilting or inclination of the wobble plate and thus of the stroke of the pumping pistons of the fluid pump.

Two sets of driving means are thus independently operable at a gradual and closely controlled speed, that is, with a speed that may be varied in an infinite degree or continuously variable. One variable speed drive is used to control the raising and lowering of the head stock or longitudinal movement of the table toward or from the head stock, while the other controls either the driving of the boring bar in forward or reverse direction, or the cross feed of the table. Thus the boring bar may be fed at a controlled speed where the table may be moved from the cross head, or the table may be moved at an independently controlled speed. Or the table may be fed crosswise at one of the variable drives and longitudinally, or may be fed crosswise while the head stock is moved vertically.

For example, by moving the cross head vertically and the table crosswise relative to a cutter that is rotated by the boring bar drive, a relative movement may be obtained between the cutting tool and the workpiece along a path of any regular or irregular design because the vertical movement of the head stock and the cross movement of the table may be varied separately and independently and a constant rather than a step by step change of speed.

For example, the cross head might be moved vertically and the table crosswise at the same speed to bring the cutting element upwardly or downwardly at a 45° inclination and could be changed slightly or rapidly at any point by varying either the cross feed of the table or the vertical feed of the head stock. At the same time the rate of rotation of the cutter bar might be controlled, for any desired purpose, from extremely slow to a very high speed.

Another combination of movements might be the independent movement of the table longitudinally and crosswise, or the vertical movement of the head stock with a controlled horizontal feed of the boring bar.

With the above combination of feeds, therefore, a very flexible control is obtained as to the direction of movement of the various elements and their rate of movement.

Another change is that the variable delivery pump being controlled through a flexible connection may be controlled from any part of the apparatus so that an operator may stand by the workpiece and control the cross feed and vertical movement of the head stock while observing the actual movement of the cutter.

What I claim is:

1. A rotating tool holding element, a variable speed electric motor, means to vary the voltage of current to the armature of said motor and of the amount of current to the field to control the speed of said motor throughout a wide range, power transmission means from said motor to said rotating tool holding element comprising two alternate gearings of different speed ratios, means to select either of said gears alternatively, a constant speed electric motor, a variable displacement feed pump driven by said constant speed motor, a hydraulic motor driven from said pump and means driven by said hydraulic motor to advance said rotating tool holding element.

2. A machine comprising a rotating tool holding element, a variable speed electric motor, means to vary the voltage of current to the armature and the amount of current to the field of said motor to control the speed thereof throughout a wide range, power transmission means from said motor to rotate said rotating tool holding element, a constant speed electric motor, a pair of variable displacement pumps driven by said constant speed motor, means to vary the displacements of said pumps independently by constant gradation, hydraulic motors driven individually from said pumps, a table holding saddle movable parallel to the axis of rotation of said tool holding element, a table slidable transversely on said saddle, and means driven from one of said hydraulic motors to move said saddle and from the other of said hydraulic motors to move said table transversely on said saddle.

3. The machine of claim 2 having distance operated means for varying the displacements of said pumps independently.

4. A machine comprising a rotating tool holding element, a variable speed electric motor, independent means to vary the voltage of current to the armature and the amount of current to the field of said motor to control the speed thereof throughout a wide range, power transmission means from said motor to said tool holding element to rotate the latter, a constant speed electric motor, a variable displacement hydraulic pump driven by said constant speed motor, a hydraulic motor driven from said pump, means actuated by said motor to move said tool holding element in a vertical direction, a second variable displacement hydraulic pump driven by said constant speed motor, a second hydraulic motor driven by said second pump and means actuated by said second hydraulic motor to move a workpiece longitudinally of said tool holding element.

5. A machine comprising a rotating tool element, a variable speed electric motor to rotate said tool holding element, means to vary the voltage of current to the armature and the amount of current to the field of said motor to control the speed thereof throughout a wide range, a constant speed electric motor, a pair of variable displacement hydraulic pumps driven by said constant speed motor, means independently to vary the delivery rates of said hydraulic pumps by infinitely small gradations, a pair of hydraulic motors driven individually by said pumps, a saddle movable in a direction longitudinal to the axis of rotation of said tool holding element, a table movable transversely on said saddle, means actuated by one of said hydraulic motors to move said table transversely and means also actuated by said hydraulic motor to feed said rotating tool holding element in the direction of its axis of rotation, and means actuated by the other of said hydraulic pumps to move said tool holding element vertically or to move said saddle longitudinally of said tool holding element.

6. A machine comprising a rotating tool element, a pair of hydraulic pumps having a continuously variable delivery up to a maximum, a pair of hydraulic motors one driven by one of said pumps and the other by the other of said pumps, a workpiece holding means movable longitudinally and transversely of the axis of rotation of said tool element, means driven alternatively by one of said hydraulic motors to raise said tool element or to move said workpiece longitudinally and means driven alternatively by the other of said hydraulic motors to move said workpiece transversely or to advance said tool element longitudinally of its axis of rotation.

7. A machine comprising a rotating tool element, a pair of hydraulic pumps having a continuously variable delivery up to a maximum, a pair of hydraulic motors one driven by one of said pumps and the other by the other of said pumps, a workpiece holding means movable longitudinally and transversely of the axis of rotation of said tool element, means driven alternatively by one of said hydraulic motors to raise said tool element or to move said workpiece longitudinally, means driven alternatively by the other of said hydraulic motors to move said workpiece transversely or to advance said tool element longitudinally of its axis of rotation and means to reverse each of said hydraulic motors.

8. A machine comprising a rotating tool element, a pair of hydraulic pumps having a continuously variable delivery up to a maximum, a pair of hydraulic motors one driven by one of said pumps and the other by the other of said pumps, a workpiece holding means movable longitudinally and transversely of the axis of rotation of said tool element, means driven alternatively by one of said hydraulic motors to raise said tool element or to move said workpiece longitudinally, means driven alternatively by the other of said hydraulic motors to move said workpiece transversely or to advance said tool element longitudinally of its axis of rotation, means to reverse each of said hydraulic motors, and means to drive each of said pumps and motors at a speed above said variable speed limit.

9. A machine comprising a rotating tool element, a pair of hydraulic pumps of variable stroke, means to drive said pumps at a constant speed, means to vary the stroke of said pumps with infinitely small gradation from zero to a maximum, a pair of hydraulic motors one driven by one of said pumps and the other by the other of said pumps, a workpiece holding means movable longitudinally and transversely of the axis of rotation of said tool element, means driven alternatively by one of said hydraulic motors to raise said tool element or to move said workpiece longitudinally and means driven alternatively by the other of said hydraulic driven motors to move said workpiece transversely or to advance said tool piece longitudinally of its axis of rotation.

10. A machine comprising a rotating tool element, a pair of hydraulic pumps each having cylinders and pistons arranged about an axis of symmetry, a rotating element rotating in said axis of symmetry and having a pressure plate bearing against and actuating the pistons in said cylinders, means to tilt said plate progressively in infinitely small gradation from a plane at right angles to the axis of rotation to vary the delivery of said pumps, a feed pump to supply said pistons at a lower pressure, means to by-pass the delivery from said low pressure pump, a constant speed motor to drive said pumps, a hydraulic motor for each of said pumps, a workpiece holding means driven transversely by one of said hydraulic motors and longitudinally of the axis of said tool holding means by the other of said hydraulic motors, means driven by one of said hydraulic motors to elevate said tool holding means and means driven by the other of said motors to advance said tool holding means, and manually controlled means to reverse said motors and to connect them alternatively to said workpiece holding means and to said tool holding means and to vary the stroke of said hydraulic pumps.

11. A machine comprising a rotating tool holding element, a constant speed motor, a pair of variable displacement pumps driven by said constant speed motor, means to vary the displacement of said pumps independently of each other by constant gradation, a pair of hydraulic motors one driven by one of said pumps and the other driven by the other of said pumps, a work holding table actuated transversely by one of said hydraulic motors and means actuated by the other of said hydraulic motors to raise or lower said tool holding means.

12. A machine comprising a rotating tool holding element, a constant speed electric motor, a pair of variable displacement pumps driven by said constant speed motor, means to vary the displacement of said pumps independently by constant gradation, hydraulic motors driven individually from said pumps, a table holding saddle movable parallel to the axis of rotation of said tool holding element, a table slidable transversely on said saddle, and means driven from one of said hydraulic motors to move said saddle and from the other of said hydraulic motors to move said table transversely on said saddle.

13. A machine comprising a rotating tool holding element, a pair of independently variable displacement pumps, a pair of hydraulic motors driven respectively by said pumps, a worktable, means driven by one of said motors to vary the relative transverse positions and by the other of said motors to vary the relative elevation of said table and said tool holding element.

14. A machine comprising a rotating tool holding element, a worktable movable transversely and longitudinally of the axis of rotation of said tool holding element, means to raise and lower said tool holding element and means to move said tool holding element longitudinally of its axis of rotation, a pair of hydraulic motors, transmission means from one of said motors to said means for moving said work holding table longitudinally and for raising and lowering said tool holding element, means to connect said motor alternatively and selectively to either said means, transmission means from the other of said hydraulic motors to move said table transversely or alternatively to advance said tool holding means and a pair of variable delivery pumps delivering to said hydraulic motors respectively.

15. A machine comprising a head stock and a tool bar carried thereby, a screw engaging said head stock to raise and lower said head stock, a work piece holding table and a screw for moving said table longitudinally of said tool bar, a hydraulic motor to rotate said screw and a variable delivery hydraulic pump delivering to said hydraulic motor and means to drive said screws alternatively from said hydraulic motor, a third screw to move said work piece table transversely, and a fourth screw for feeding said tool bar forwardly, a second hydraulic motor independent of said first motor for driving said third and fourth screws alternatively, a second variable delivery hydraulic pump to supply said second hydraulic motor and an electric drive for rotating said tool bar, said drive comprising a generator and a motor driven by said generator and means to vary the field currents of said motor and generator independently of each other.

16. The machine of claim 15 in which the delivery of said hydraulic pumps is controlled by varying the effective length of strokes of the pistons of said pumps.

17. A machine comprising a rotating tool holding element, a variable speed electric motor driving said tool holding element to rotate the latter, a constant speed electric motor, a variable displacement hydraulic pump driven by said constant speed motor, a hydraulic motor driven from said pump, means actuated by said motor to move said tool holding element in a vertical direction, a second variable displacement hydraulic pump driven by said constant speed motor, a second hydraulic motor driven by said second pump and means actuated by said second hydraulic motor to move a workpiece longitudinally of said tool holding element.

18. A machine comprising a rotating tool holding element, a pair of hydraulic pumps, a pair of hydraulic motors one driven by one of said pumps and the other by the other of said pumps, the relative displacement of each said pump and its respective motor being continuously variable, a workpiece holding means movable longitudinally and transversely of the axis of rotation of said tool element, means driven alternatively by one of said hydraulic motors to raise said tool element or to move said workpiece longitudinally, and means driven alternatively by the other of said hydraulic motors to move said workpiece transversely or to move said tool element longitudinally of its axis of rotation.

HARRY F. PHILLIPS.